United States Patent [19]
Bullock et al.

[11] Patent Number: 5,267,338
[45] Date of Patent: Nov. 30, 1993

[54] LOW PROFILE CABLE HAVING COMPONENT BREAKOUTS AND PROCESSES FOR THEIR MANUFACTURE

[75] Inventors: Roddy M. Bullock, San Marcos; Douglas A. Voorhis, Austin, both of Tex.

[73] Assignee: W. L. Gore & Associates, Inc., Newark, Del.

[21] Appl. No.: 880,818

[22] Filed: May 8, 1992

[51] Int. Cl.⁵ .................................................. G02B 6/44
[52] U.S. Cl. .................................... 385/100; 385/103; 385/113
[58] Field of Search ............... 385/100, 101, 102, 103, 385/104, 113, 86, 109

[56] References Cited

U.S. PATENT DOCUMENTS

| | | | |
|---|---|---|---|
| 4,365,865 | 12/1982 | Stiles | 385/103 X R |
| 4,435,238 | 3/1993 | Smith | 385/109 X R |
| 4,626,067 | 12/1986 | Watson | 385/86 |
| 4,772,089 | 9/1988 | Ide et al. | 385/113 |
| 4,826,277 | 5/1989 | Weber et al. | 385/100 |
| 5,138,684 | 8/1992 | Bullock et al. | 385/102 X |
| 5,165,003 | 11/1992 | Carter | 385/113 X |

Primary Examiner—John D. Lee
Assistant Examiner—Phan T. Heartney
Attorney, Agent, or Firm—Gary A. Samuels

[57] ABSTRACT

A low profile cable housing a multiplicity of electrical, mechanical, or optical fiber components or a mixture thereof which has component breakouts within the length of the cable at any point or points between the ends of the cable which do not add to the profile or mass of the cable and processes for its manufacture and for sizing a cable to constant cross-section.

6 Claims, 5 Drawing Sheets

LOW PROFILE CABLE HAVING COMPONENT BREAKOUTS AND PROCESSES FOR THEIR MANUFACTURE

FIELD OF THE INVENTION

The invention relates to electro-mechanical-optical cables which have break-outs for components thereof and processes for their manufacture.

BACKGROUND OF THE INVENTION

Generally electrical cables serve the purpose of transmitting signals or power from one end to the other uninterrupted. At times, however, it is desirable to tap into the conductors at places within the length of the cable between the ends. One reason for such a break-out would be to provide a point for a branch out of additional signal or power lines from the main line. Another reason break-outs are necessary is for the attaching of active components to the cable, such as hydrophones for undersea sonar array cables.

Making the break-outs of conductors from a cable is complicated when, in addition to the electrical, optical, or mechanical components, the cable also serves as a mechanical strength member, usually loaded in tension. A common method, known in the art for strength members, is to braid a high-modulus fiber, such as Kevlar ® aromatic polyamide, over the cable core prior to finishing processes, such as extrusion of the final jacket.

At the break-out point or points, one or all of the conductors may be broken out. Gaining access to the particular conductors to be broken out of the completed main cable is difficult, and generally results in partial destruction of cable components or degradation of mechanical properties at the point of breakout.

One alternative to making the breakouts from an unaltered finished cable is to make the breakouts at the time of laying up the conductors or fiber optics into a cable and leaving the ends of the broken out conductors exposed outside of the cable. At the stage of braiding the high-modulus fiber strength member around the cable, the cut ends of the conductors can be brought out through one of the openings of the braid. Then the whole construction can have a jacket extruded over it by using a tube extrusion process common in the art.

The disadvantage of using the above approach for making the breakouts are as follows. At the point of breakout, the effect is to add additional components to the cable thus effectively increasing the diameter at that point. This increase in diameter forms a "lump" in the cable which follows through all subsequent processing steps, including braiding of the strength member, and extrusion of the final jacket. If any finished cable cross-section other than round is necessary, such as an airfoil shape, then a pressure extrusion process must be used for the final jacket. One of the requirements for pressure extrusion common in the art is that the core being extruded over must have a constant cross-section, that cross-section being held to tight tolerances. Any increase in cross-section of the core, such as would occur with making breakouts, would prevent the core from passing through the extrusion tip. Another disadvantage of bringing the broken out ends out of the braid openings is the shearing action of the braid on the conductors when the cable is loaded and extended axially. As the cable is loaded in tension, the individual strands of fiber in the braid try to straighten out. The straightening out of the braided fibers and the resulting increase in cable length is normally not a problem. However, when conductors, or more importantly optical fibers, are broken out of the cable through the braid, the straightening out of the fibers of the braid produces a shearing action which tends to crush, or possibly cut through, the conductors or optical fibers.

The present invention provides for a high-strength, electromechanical optical cable with manufactured breakouts which do not increase the cable diameter. Additionally, the present invention provides for the cable to be loaded and extended axially without damage to the conductors or optical fibers housed therein at the breakout points.

SUMMARY OF THE INVENTION

The invention comprises a cable housing a plurality of one or more electrical components, such as twisted pairs, coaxial cables, or power conductors, fiber optic cables, such as buffered or unbuffered optical fibers, or mechanical components, such as a hydraulic tube, laid up together to form the cable. One or more of the components are broken out of the cable at predetermined points, the cable sheathed with a high-modulus fiber strength member, and jacketed by means of a standard tube or thermopolymer pressure extrusion process. The cable may be shaped to have a circular or non-circular cross-section by a process in which the cable is passed through a shaping die just prior to or during application of the jacket.

The components are laid up into a cable in any standard manner known in the art. At the points where a breakout of any of the components is necessary, the components to be broken out are pulled up into a loop. Generally, this loop is on the order of a few inches or less in length. The loop is cut, and the now exposed ends may now be taped down to the cable. Any binders or overwraps may be applied over the cabled core while carefully allowing the broken out ends to protrude through the wrap.

The cable is marked on either side of the breakout point at an appropriate distance apart. A standard braider known in the art is used to apply a high modulus strength member over the cabled core. When the first mark reaches the point of braid application, the braider is stopped. Without changing any of the manufacturing equipment and setup, and with the braider turned off, the braider capstan which is used to pull the braided core through is turned until the second mark on the other side of the breakout point is at the point of braiding. This process has now formed a section of parallel, non-braided, fibers, the length of which is determined by the length between the marks on the cabled core. The broken out ends may now easily be brought through the parallel fibers parallel to the core underlying the fibers, and once again taped down to the cabled core. The braider is started, and the normal braiding operation resumes until the next breakout point is encountered, at which time the process is repeated.

By applying the high-modulus strength member parallel at the point of breakout, two objectives are accomplished. First, the mass per unit length of the strength member is substantially less at the parallel portion of the cable. This mass difference of a braided strength member is due to the inherent properties of a braid, in which strands of material are interwoven in opposing helical paths. The actual amount of mass increase per unit length depends on the helical angle of the braid, and for any angle of braid, the parallel portion of the strength member will have less mass per length. This area of less mass allows the broken out components to be laid down into the core, so that the excess volume made available is filled by the broken out components without increasing the diameter of the cabled core. The second objective which is accomplished by going parallel with the strength member is that now the broken out components do not experience the shearing action of a braided strength member at the point of breakout. Since at the point of breakout the strength member fibers are parallel, no crossovers of the material are present, and no straightening of these crossovers can act as shearing mechanisms.

After braiding the strength member, an overwrap or binder of a soft, smooth material, such as expanded polytetrafluoroethylene (ePTFE) may be applied, if necessary, to facilitate the extrusion process. At this point, if needed or desired and as another aspect hereof, the cable may be passed through a die to shape it to a circular, oval, or other desired cross-section. The overwrap or binder, either before or after the sizing process, and the extruded jacket are applied to the cable over the broken out components. As a final step, the finished cable is opened at the points the breakouts occur, and the cut ends pulled out and made ready for connection to outside cables or devices.

BRIEF DESCRIPTION OF THE DRAWINGS

FIG. 1 shows a loop being pulled up to make a breakout of one of the components.

DETAILED DESCRIPTION OF THE INVENTION

The invention is now desribed in terms of the figures to more carefully delineate in more detail the scope, materials, conditions, and processes of the invention.

Figure 1:
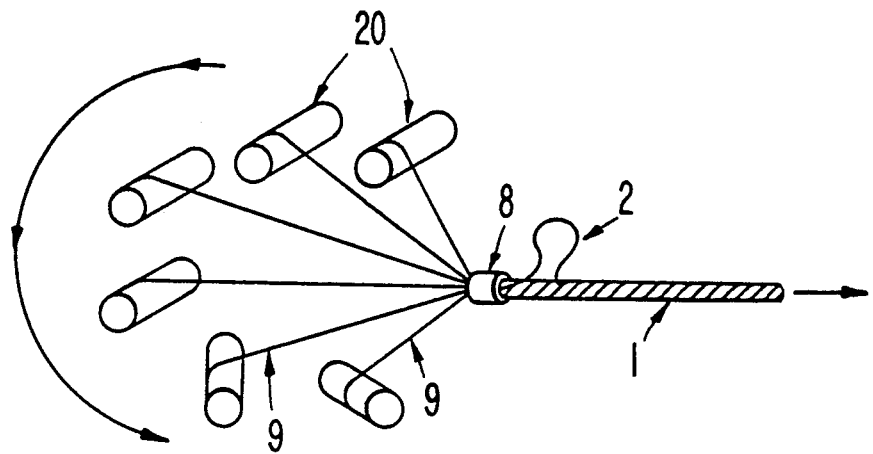
FIG. 1 is a schematic view of a cabling process showing the individual components being helically laid up into a cable.

FIG. 1 shows a set of components 9, which may be electrical, optical, hydraulic, or mechanical, being helically laid up into a cable. The components on supply spools 20 rotate as a unit together about a common axis, and the components 9 come together at a die 8 into a cable 1. One component is shown being pulled into a loop 2. This loop will be cut to make the ends of the breakouts. It is preferred to make the loop at the cabling die where additional length may be pulled through to make the loop. After the loop or loops are made, normal cabling may be continued.

Figure 2:
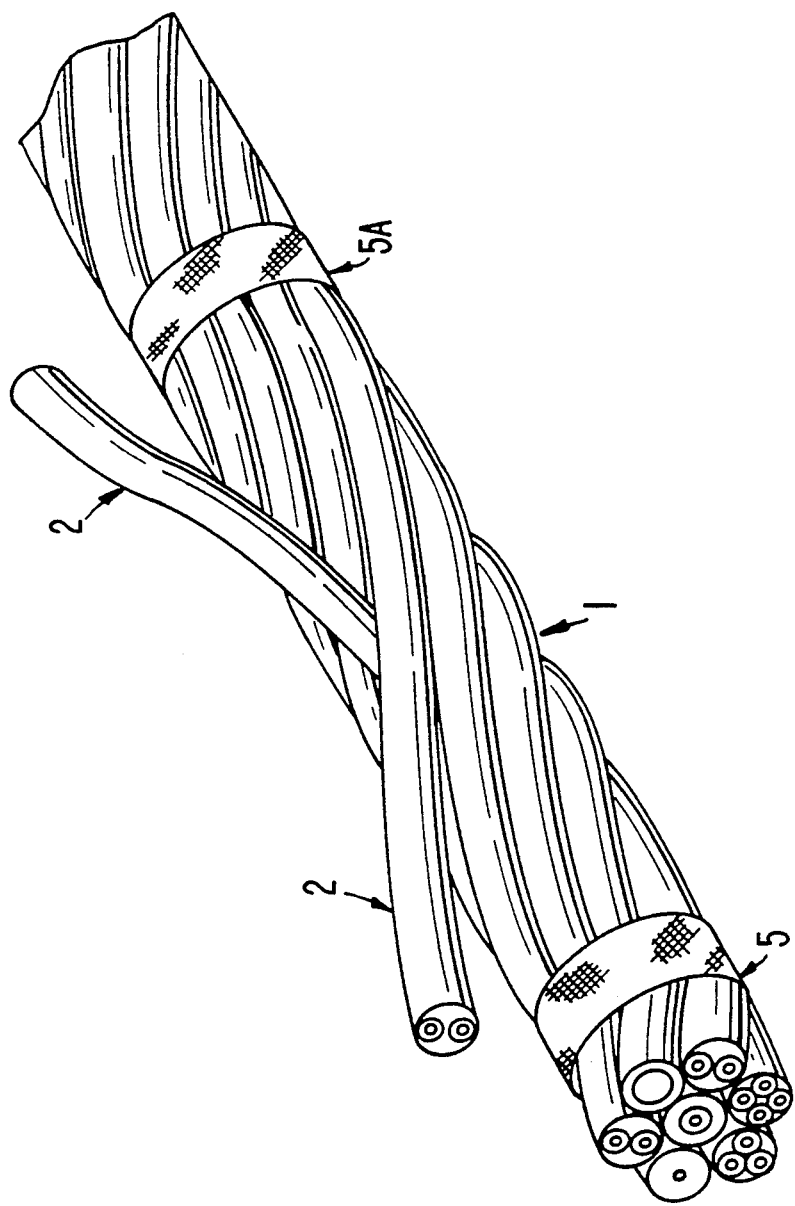
FIG. 2 is a perspective view of the cabled components with a breakout of one of the components, and the marks on either side of the breakout.

FIG. 2 shows the cabled core 1 with a single breakout of one of the components 2. Marks 5 and 5A are made on the core to show where to start and stop the braid. If additional components such as binders or overwraps are to be applied prior to the application of the braid, then the marks would be made on those binders or overwraps.

Figure 3:
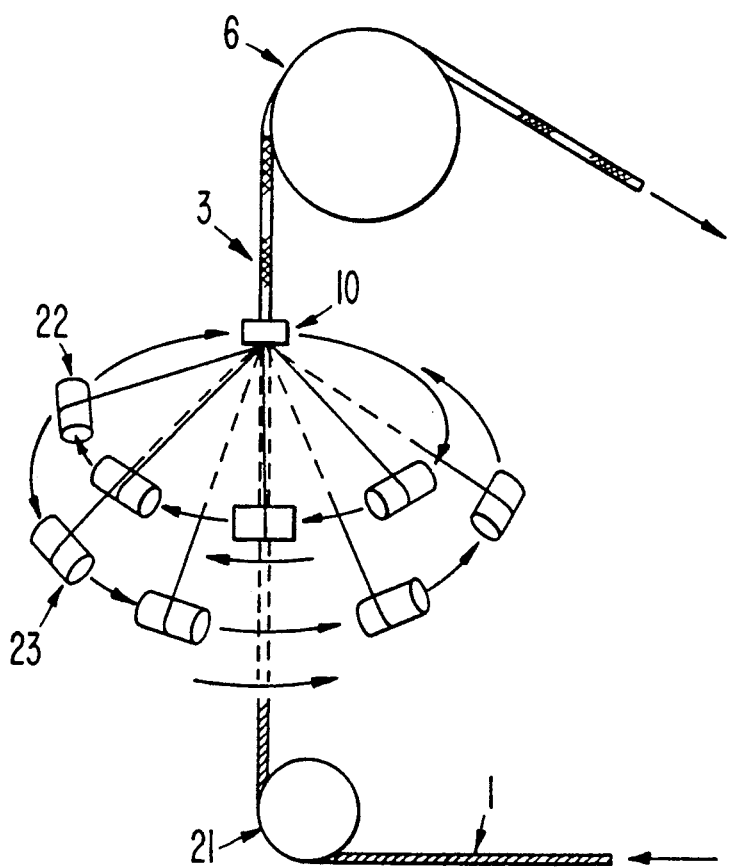
FIG. 3 is a schematic view of a typical braiding machine with a cabled core being braided.

FIG. 3 shows the braiding of the high-modulus strength member 3 onto the cable core. The strength member may be any of the aramids, such as Kevlar ®, made by E. I. duPont de Nemours and Co., Inc., or a liquid crystal polymer (LCP) fiber such as Vectran ®, made by Hoechst Celanese Corporation, or polyethylene or polypropylene fibers as made by Allied Corporation, and marketed as Spectra, or any of the various high-modulus fibers available. The cabled core 7 comes from a stationary payoff reel 21 into the braiding die 10. Counter-rotating sets 22 and 23 of bobbins of strength member material interweave the strength member into a braid 3, with braid 3 forming at or near the die. When the first mark 5 (as shown in FIG. 2) on the cabled core reaches the braiding die 10, the braider is stopped, which stops the capstan 6 and the counter-rotating sets of bobbins 7. At this time the capstan 6 is turned in a manner to pull additional cable through the die, without the counter-rotating bobbins 7 rotating. The capstan 6 is turned until the second mark 5A reaches the braiding die 10. At this time, braiding is resumed in the normal manner, until the next mark for the next breakout reaches the braiding die 10 and the process is repeated.

Figure 4:
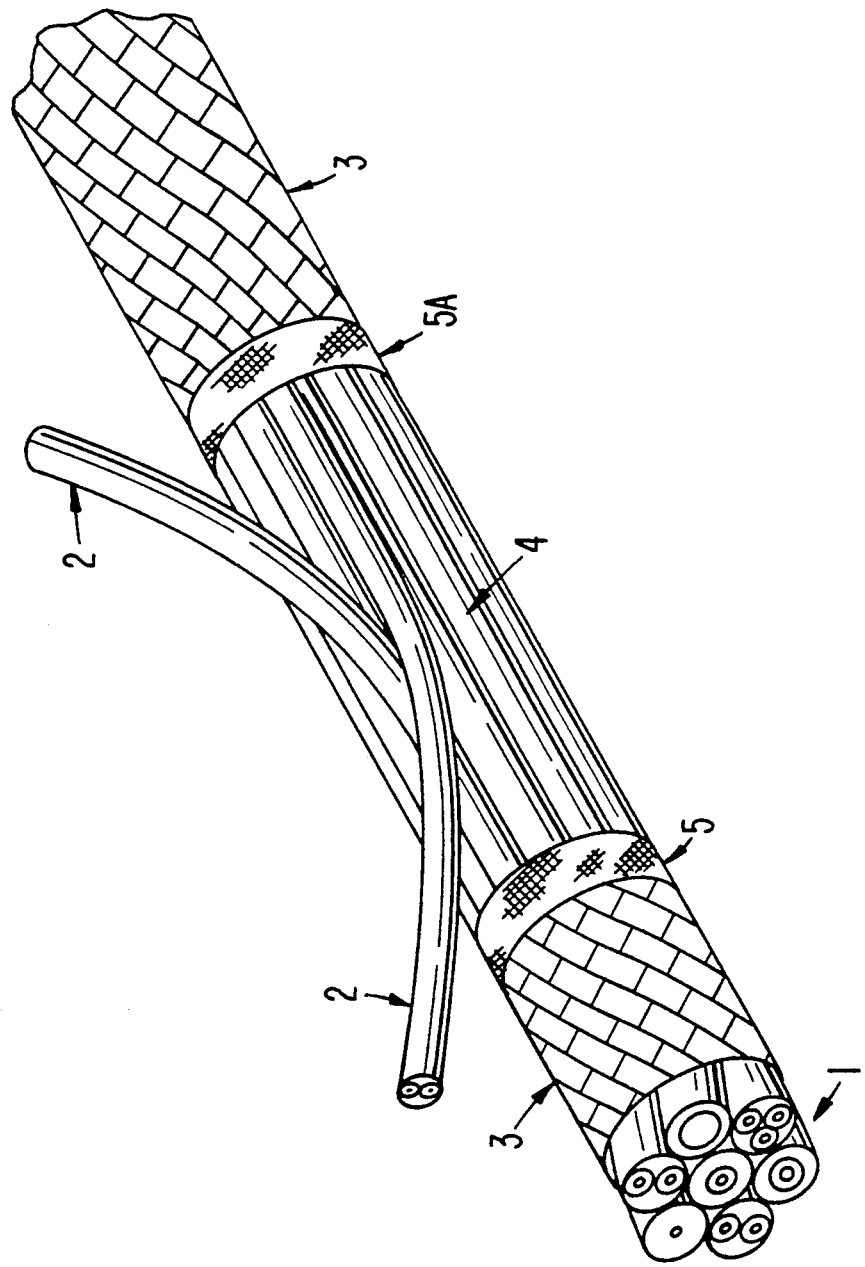
FIG. 4 is a perspective view of the braided core with the parallel section at the breakout point.

FIG. 4 shows the breakout section after braiding the strength member. The braid 3 stops, and the strength members 4 are run parallel for the interval required for the broken out component 2.

Figure 5:
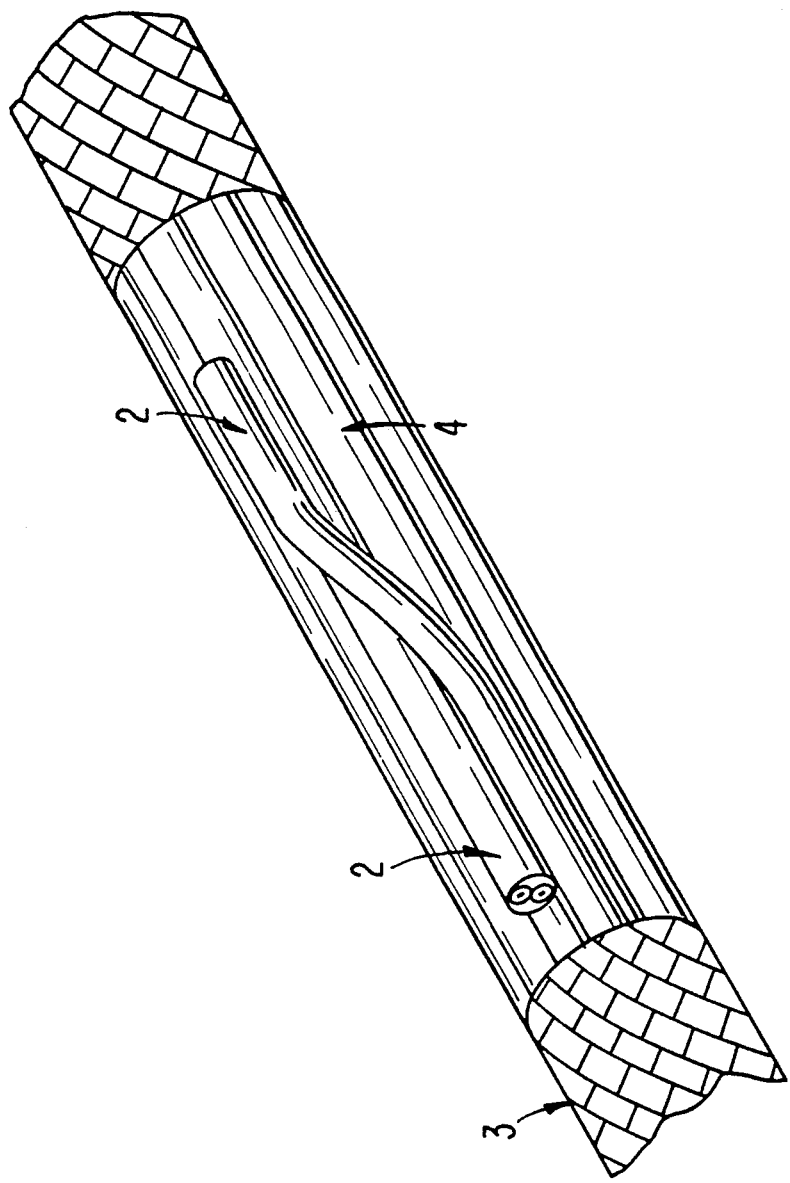
FIG. 5 is a perspective view of the braided core with the parallel section at the breakout point, and the broken out component laid down into the parallel fiber section, ready for binders, sizing through a die, or extruded jacket.

FIG. 5 shows the completed, low profile breakout, ready for further processing. The broken out component 2 is pushed down into the space made available in the parallel fiber 4 area. This space is available by virtue of not having the fibers braided, and the resulting decrease in mass per unit length in this area resulting therefrom.

The cable may now be further processed in any manner which an ordinary cable would, such as application of binder tapes, sizing through a die to a desired cross-section, or extrusion of the final jacket.

Figure 6:
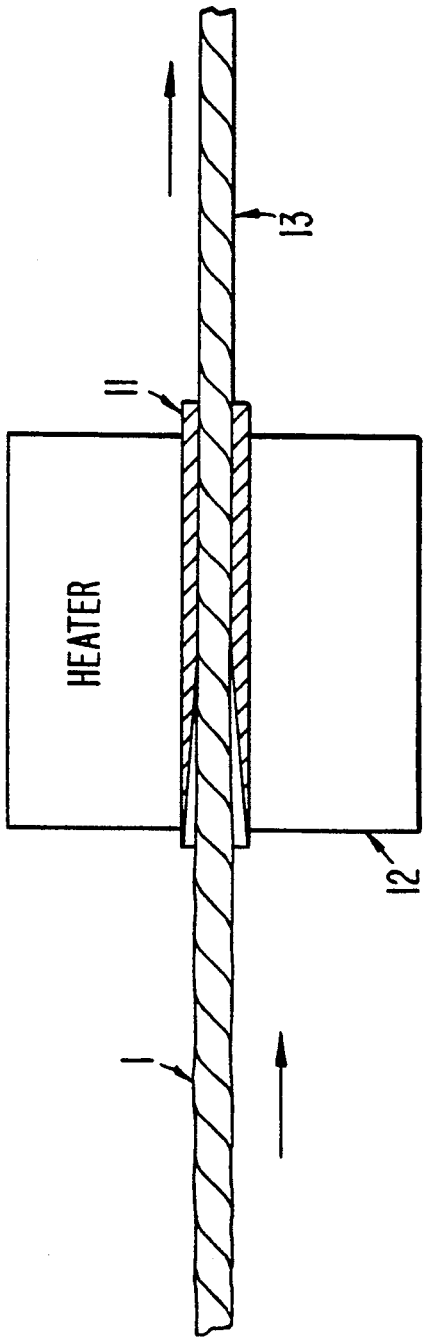
FIG. 6 is a front view of a cable core of irregular cross-section passing through a sizing die to give a core of constant cross-section.

FIG. 6 displays a cable 1, which is uneven in cross-section along the cable, passing through a sizing die 11 surrounded by a heater 12. Issuing from die 11 is a sized cable 13 of constant cross-section.

A convenient sizing process useful as a step in forming the above cable may be used when the cross-section of the cable to be processed is not as round as desired. The method usually resorted to in the art is to add strands of filler to aid in achieving a round cable. However, this does not always lead to a circularly cross-sectional cable after subsequent processing steps, such as tapewrapping, braiding, or extrusion of a jacket around a cable core. This problem can be alleviated wrapping the cable construction before braiding, for example, with a wrap of soft unsintered expanded polytetrafluoroethylene (ePTFE) tape, sizing the wrapped construction by pulling it through a die to form the desired shape, then sintering the wrap to give a shaped construction of constant cross-section. Other binders than ePTFE tape may be used and oval or other geometric shapes of dies than circular may be used. This die-shaping process to constant cross-section may be applied to a wide variety of electrical and optical fiber cables wherein such a configuration of constant cross-section is needed or desirable. Roundness can be achieved after the cabling stage with or without the use of filler strands and a cabled core may be preshaped for non-round tube extruded cables The ePTFE cited as an example of soft binder material is that disclosed in U.S. Pat. Nos. 3,953,566, 3,962,153, 4,096,227, 4,187,390, 4,902,423 and 4,478,665, assigned to W. L. Gore & Associates, Inc.

We claim:

1. A low profile cable having component breakouts at one or more intermediate points between the ends of the cable which do not augment the diameter of the cable comprising:

(a) a multiplicity of elongated electrical, optical fiber, or mechanical components or mixtures thereof stranded into a cable core;

(b) a strength member fiber braid surrounding said core to a marked breakout point;

(c) a section of parallel unbraided strength member fibers of predetermined length adjacent said braided fibers extending to the next subsequent marked breakout point;

(d) cut ends of a component of said core, resulting from severing a loop of said component withdrawn from said core and laid parallel to said parallel strength member fibers;

(e) a fiber strength member braid surrounding a section of said core subsequent to said section of unbraided strength member fibers;

(f) a binder surrounding said strength member fiber braid and unbraided parallel strength member fiber sections; and (g) an extruded protective jacket surrounding said binder.

2. A cable of claim 1 wherein said strength member fibers are selected from the group of high modulus fibers consisting of aromatic polyamide, liquid crystal polymer, polyester, polypropylene, polyethylene, polyphenol polymers, and glass.

3. A cable of claim 1 wherein said binder comprises a fluorocarbon.

4. A cable of claim 3 wherein said fluorocarbon comprises expanded polytetrafluoroethylene.

5. A cable of claim 1 of a die-sized constant cross-section.

6. A process for manufacture of a low profile cable having component breakouts at one or more intermediate points between the ends of the cable comprising the steps of:

(a) laying up helically into a cable core a multiplicity of electrical, mechanical, or optical fiber components or mixtures thereof;

(b) braiding a strength member fiber around said core a predetermined distance along said cable to a marked breakout point;

(c) continuing application of strength member fiber to a subsequent predetermined marked point to provide a section of parallel strength member fibers surrounding said core;

(d) breaking out through said parallel fibers a loop of core component;

(e) severing said loop of core component;

(f) laying parallel to the remaining uncut components within said cable the cut ends of said loop of component;

(g) continuing braiding strength member fiber around said core.

(h) applying a binder around said braided strength member;

(i) optionally sizing said binder-wrapped core through a die to constant cross-section along the length of said core; and (j) applying an extruded jacket around said core.

* * * * *